(12) United States Patent
Lv et al.

(10) Patent No.: US 12,737,240 B2
(45) Date of Patent: Sep. 15, 2026

(54) HANDLING APPLICATION EVENTS OCCURRING ON INACTIVE OR DISCONNECTED VIRTUAL DESKTOPS

(71) Applicant: Omnissa, LLC, Mountain View, CA (US)

(72) Inventors: Lin Lv, Beijing (CN); Zhi Lin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 458 days.

(21) Appl. No.: 17/944,898

(22) Filed: Sep. 14, 2022

(65) Prior Publication Data

US 2024/0020179 A1 Jan. 18, 2024

(30) Foreign Application Priority Data

Jul. 15, 2022 (WO) ................ PCT/CN2022/105930

(51) Int. Cl.
*G06F 9/54* (2006.01)
*G06F 9/451* (2018.01)

(52) U.S. Cl.
CPC .............. *G06F 9/542* (2013.01); *G06F 9/452* (2018.02)

(58) Field of Classification Search
CPC ................................ G06F 9/542; G06F 9/452
See application file for complete search history.

(56) References Cited

U.S. PATENT DOCUMENTS 6,779,187 B1 * 8/2004 Hammond .......... G06F 9/44521 719/331
9,189,264 B1 * 11/2015 Steffen .................... G06F 9/542
9,380,562 B1 * 6/2016 Vetter ..................... H04L 63/08
10,331,475 B2 * 6/2019 Beveridge ............... G06F 9/452
2012/0092277 A1 * 4/2012 Momchilov ............ G06F 3/038 345/173
2012/0151373 A1 * 6/2012 Kominac .............. H04L 67/141 715/740
2014/0372506 A1 * 12/2014 Butner .................... H04L 67/04 709/203
2015/0012837 A1 * 1/2015 Momchilov .......... G06F 3/1454 715/744

(Continued)

OTHER PUBLICATIONS

Miller et al., "Virtualization, Virtually at the Desktop", Oct. 7, 2007, SIGUCCS '07: Proceedings of the 35th annual ACM SIGUCCS fall conference, pp. 255-260 (Year: 2007).*

*Primary Examiner* — Kevin L Young
*Assistant Examiner* — Jennifer Marie Gutman
(74) *Attorney, Agent, or Firm* — Kim & Stewart LLP

(57) ABSTRACT

Techniques are described for handling application events occurring in inactive or disconnected virtual desktop sessions. These events may be any specified application events, such as videoconferencing calls, instant messaging (IM) messages, or other communication events. When an application event is detected in the virtual desktop that is idle, inactive or disconnected, a notification is sent from the virtual desktop to a connection server, which forwards the notification to the client device, where the notification about the event is displayed to the user. In response to the event, the user may be provided with an option to reestablish the connection to the virtual desktop or to launch the application in which the event was detected as a seamless window on the client device.

18 Claims, 6 Drawing Sheets

(56) References Cited

U.S. PATENT DOCUMENTS

| | | | | |
|---|---|---|---|---|
| 2015/0169616 | A1* | 6/2015 | Benraz | G06F 11/1658<br>707/622 |
| 2016/0077685 | A1* | 3/2016 | Fang | G06F 9/452<br>715/778 |
| 2016/0378782 | A1* | 12/2016 | Jiang | G06F 21/6245<br>726/7 |
| 2019/0132381 | A1* | 5/2019 | Momchilov | G06F 3/01 |
| 2020/0133694 | A1* | 4/2020 | Bosnjakovic | H04L 65/764 |
| 2020/0228606 | A1* | 7/2020 | San | H04L 67/143 |
| 2020/0374207 | A1* | 11/2020 | Ramareddy | G06F 9/4418 |
| 2020/0394084 | A1* | 12/2020 | Borkar | G06F 9/542 |
| 2022/0210230 | A1* | 6/2022 | Yu | G06F 21/84 |
| 2022/0255912 | A1* | 8/2022 | Ingale | H04L 67/55 |
| 2022/0382572 | A1* | 12/2022 | Lv | G06F 9/45545 |
| 2023/0236854 | A1* | 7/2023 | Luo | G06F 9/452<br>715/733 |
| 2023/0409357 | A1* | 12/2023 | He | G06F 9/45558 |
| 2024/0214434 | A1* | 6/2024 | Clark, III | H04L 65/1069 |

* cited by examiner

HANDLING APPLICATION EVENTS OCCURRING ON INACTIVE OR DISCONNECTED VIRTUAL DESKTOPS

CLAIM OF PRIORITY

This application is based upon and claims the benefit of priority from International Patent Application No. PCT/CN2022/105930, filed on Jul. 15, 2022, which is incorporated by reference herein in its entirety.

TECHNICAL FIELD

The present disclosure generally relates to virtual desktop environments and more specifically to techniques for handling application events occurring on inactive or disconnected virtual desktops.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There are many implementations of desktop virtualization, some of which offer a full desktop while others provide individual remotely accessible applications. Regardless of the implementation, a common characteristic of these technologies is that the application execution takes place on remote host server usually located in a data center, while the user uses a local client device to access the application over a network connection. For example, in a conventional VDI deployment, each user in an enterprise is provisioned a virtual desktop and is allowed to access their virtual desktop over a network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remote display protocol, such as Remote Desktop Protocol (RDP), PC-over-IP protocol (PCoIP), VMware Blast, virtual network computing (VNC) protocol, or the like. Using the remote display protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

Users frequently install videoconferencing, instant messaging (IM) or other communication software on their virtual desktops in order to be able to connect and communicate with other users. However, when working on the virtual desktop, a user often switches between the virtual desktop window and their local desktop on the client device which may be running other applications. If an incoming call or message is received on the virtual desktop while the virtual desktop window is minimized or hidden from view, the user may not notice the incoming call/message because the local operating system of the client device does not generate any notifications for events happening on the remote server. Similarly, if the virtual desktop has been sitting idle for a while, it may be disconnected due to session inactivity and in that case, such an incoming call would not be received at all on the client device. Moreover, in some cases, the user may be connected to two or more remote desktops simultaneously and may miss incoming calls and messages received on one desktop while working on another desktop. A more user-friendly and efficient approach to handling certain events occurring on inactive or disconnected virtual desktops is needed.

DETAILED DESCRIPTION

Figure 1:
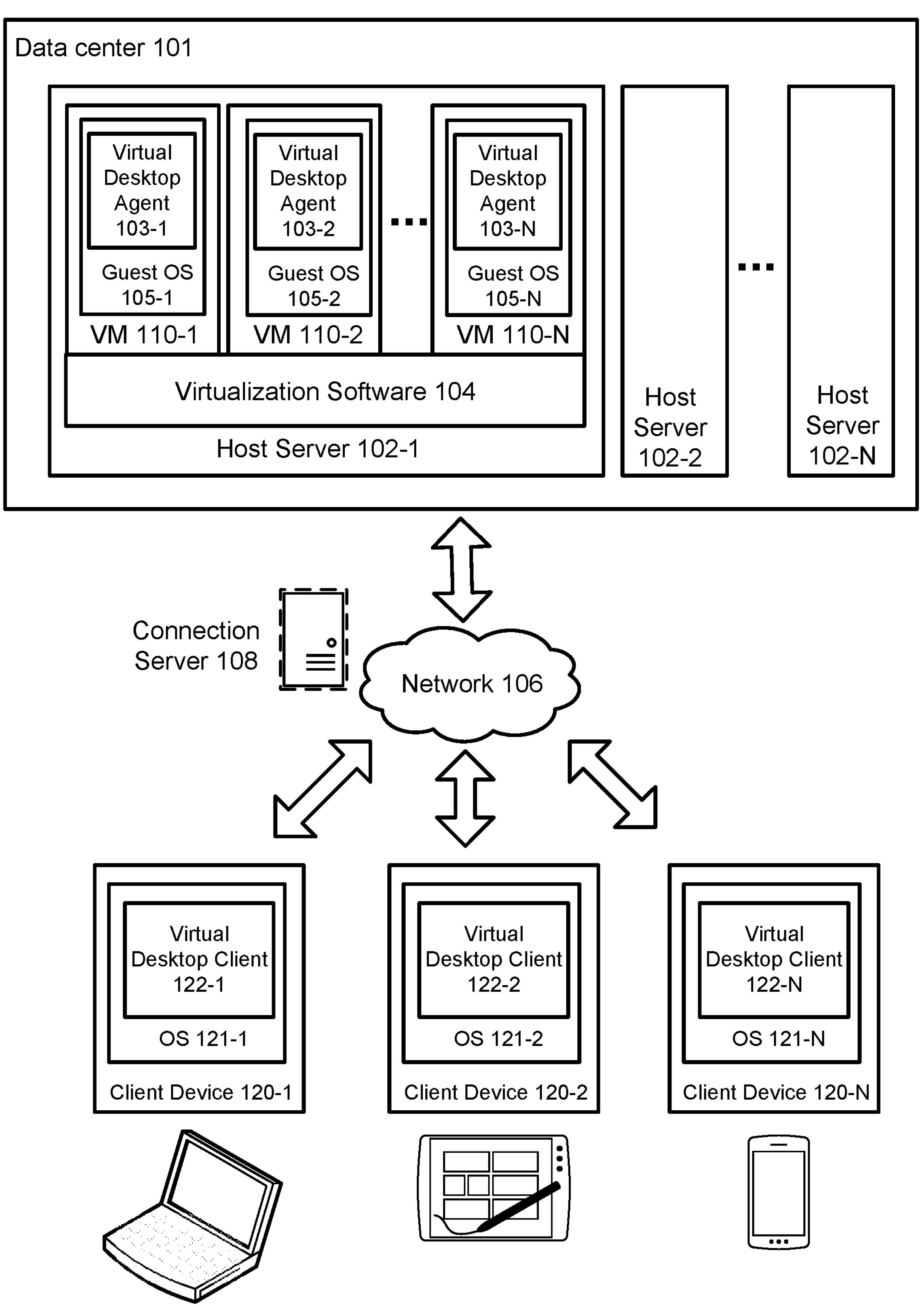
FIG. 1 illustrates an example of a virtual desktop environment, in accordance with various embodiments.

Systems and methods in accordance with various embodiments described herein overcome at least some of the deficiencies described above by providing ways to handle events occurring in inactive or disconnected virtual desktop sessions. These events may be any specified application events, such as videoconferencing calls, instant messaging (IM) messages, other communication events, or the like. In various embodiments, whenever an application event is detected in the virtual desktop that is idle, inactive or disconnected, a notification is sent from the virtual desktop to a connection server, which forwards the notification to the client device, where the notification about the event is displayed to the user, with an option to connect to the virtual desktop in response to the event.

In various embodiments, a remoting session is first established between a virtual desktop client operating on a client device and a virtual desktop agent operating on a host server. The remoting session is established by the virtual desktop client contacting a connection server, which acts as a broker for client connections. The connection server authenticates the user of the client device against the Active Directory (AD) and provisions a connection to the virtual desktop for the user. Once the remoting session is established, the virtual desktop client can directly access the virtual desktop by communicating with the virtual desktop agent running on the host server.

A set of specific application events is specified to be monitored on the virtual desktop. In one embodiment, a set of default application events can be maintained, which are automatically monitored on the virtual desktop, and the user may be provided an option to modify which application events should be monitored instead of the default selections. For example, the user may be provided with a user interface (UI) that allows the user to select the application (e.g. Slack®, Microsoft® Teams, ZOOM™, etc.) and the specific events in the corresponding application (e.g. incoming call, incoming message, etc.) that will be monitored in the virtual desktop and for which a notification will be generated.

Once the application events have been specified, a module on the virtual desktop (e.g. Application Events Tracker) will begin monitoring for the occurrence of the specified events. For example, the events may be listened to by registering with the UserNotificationListener Class in Microsoft Windows operating system (OS). In various embodiments, the events are monitored on the virtual desktop even during the time periods when the remoting session is inactive or becomes disconnected. For example, if the user leaves the remoting session idle for an extended period of time, the remoting session may be terminated due to inactivity, however, the virtual desktop client maintains a connection to the connection server and the virtual desktop agent also maintains a connection with the connection server, unless the virtual desktop is powered off according to policy. If the application events are detected on the virtual desktop during the time period while the remoting session is inactive or disconnected, a notification is generated on the virtual desktop and transmitted to the connection server. The connection server in turn, sends the notification to the virtual desktop client, indicating that the one or more application events are occurring on the virtual desktop. In other embodiments, the remoting session need not be entirely disconnected, and the user may have simply minimized the window of the virtual desktop client or otherwise hidden it from view. In those embodiments, the notifications are similarly generated and sent to the virtual desktop client, which causes the notification to be displayed on the local operating system (OS) of the client device. In the embodiments where the remoting session is still active, it is possible for the virtual desktop agent to send the notification directly to the virtual desktop client or alternatively, send the notification to the connection server, which can deliver it to the virtual desktop client, as previously mentioned.

Once the virtual desktop client receives the notification from the connection server, it displays the notification on the local client device, along with information about the application events that are occurring on the virtual desktop. The user may also be displayed an option to connect to the application on the virtual desktop, on which the events have been detected. For example, if the detected event is an incoming call on a videoconferencing application on the virtual desktop, the user may be provided with an option to connect to the virtual desktop and answer the incoming call on the video conferencing application. In some embodiments, rather than launching the entire virtual desktop UI, the virtual desktop client may display the application as a seamless application window, by hiding all other portions of the virtual desktop GUI (such as the OS toolbars and icons, etc.) and only displaying the application UI within the window.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. The client devices (120-1, 120-2, 120-N) establish virtual desktop sessions with the host servers (102-1, 102-2, 102-N) by first contacting the connection server 108. In various embodiments, the connection server 108 acts as a broker for client connections by authenticating users through Windows Active Directory (AD) and directing the request to the appropriate host server hosting the virtual machine running the virtual desktop that the user is entitled to access.

Network 106 may be a wide area network (WAN), or other form of remote communication link between the host servers (102-1, 102-2, 102-N) and client devices (120-1, 120-2, 120-N). Network 106 may further include numerous other components, such as one or more firewalls, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS). The connection server 108 can be deployed inside the corporate firewall or may be deployed as a security server in the demilitarized zone (DMZ) or may be deployed in various other locations.

Once the virtual desktop sessions have been established, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote display protocol, such as Remote Desktop Protocol (RDP), PC-over-IP protocol (PCoIP), VMware Blast protocol, Virtual Network Computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
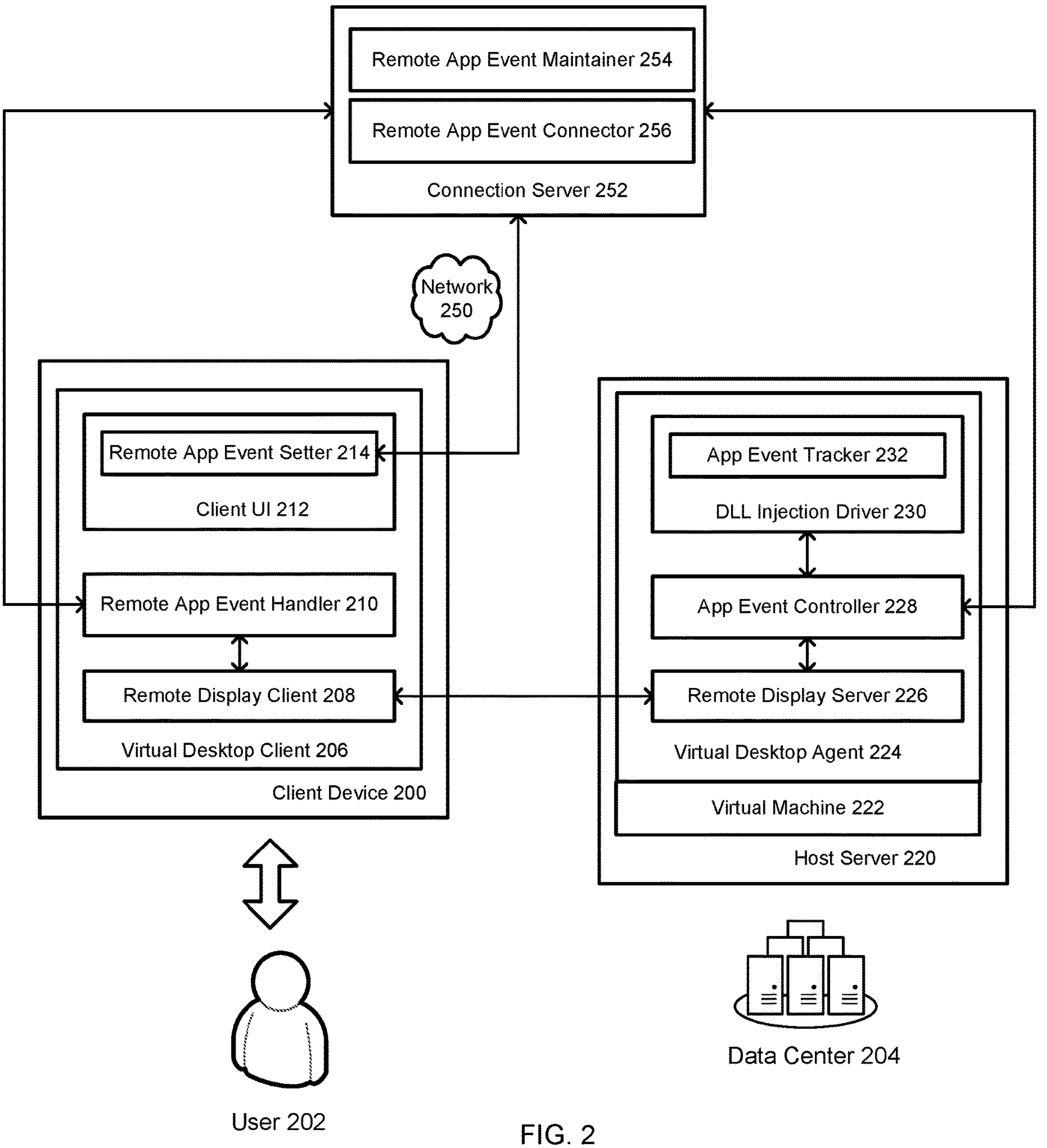
FIG. 2 is an illustration of a system for enabling the handling of application events occurring on inactive or disconnected virtual desktops, in accordance with various embodiments.

FIG. 2 is an illustration of a system for enabling the handling of application events occurring on inactive or disconnected virtual desktops, in accordance with various embodiments. As shown in the illustration, a user 202 uses their client device 200 to establish a remoting session with a virtual desktop running on a host server 220 by first contacting the connection server 252. The host server can be physically located in a data center 204 that is remotely located with respect to the user's client device 200 and the connection to the virtual desktop is established over the network 250, such as the Internet. As previously described, during the remoting session, the Remote Display Server 226 on the virtual desktop agent 224 regularly sends UI display data to the Remote Display Client 208 on the virtual desktop client 206. Similarly, the virtual desktop agent 224 receives user input data (keyboard and mouse events) from the virtual desktop client 206 to allow the user 202 to access and control the virtual desktop.

Application Event Tracker 232

In various embodiments, the Application Event Tracker 232 running on the virtual desktop agent 224 is configured to monitor the specified application events and send the event to the Application Event Controller 228 for further handling whenever an event is detected. In one embodiment, the Application Event Tracker 232 can be implemented as a dynamic link library (DLL) that is injected into the application process by a DLL Injection Driver 230. After being injected, the injected DLL can hook certain application functions so that it can be invoked when the specified application events occur that are related to those functions. Once the DLL is called by an application event, it will pop up the event to Application Event Controller 228 for further processing. The specific applications and events that need to be tracked can be specified by a user or administrator, or, alternatively, a set of default events may be utilized without any user input. To implement the Application Event Tracker 232, it may be configured to listen for any notifications or events by registering with the UserNotificationListener Class in Microsoft® Windows OS. Alternatively, for those applications that do not integrate with this standard notification mechanism, the Application Event Tracker may instead be injected into the application process and hook specific application functions in order to detect the specified events, as previously described.

Application Event Controller 228

In various embodiments, the Application Event Controller 228 can perform at least two functions. First, the Application Event Controller 228 can receive the configuration information regarding the specified application events from the Connection Server 252 when the virtual desktop is first connected to so that it knows which application events are required to be monitored for the user 202. The application events can be configured by end users or administrators using the client user interface (UI) 212 of the Remote Application Event Setter 214. This way, when the Application Event Controller 228 receives a notification of an application event from the Application Event Tracker 232, it is able to transfer only those user-specified application events to the Connection Server 252 and ignore all other events. Second, the Application Event Controller 228 checks if an end user 202 is connected to this virtual desktop and if so, it will send the application event to the client device 200 via a virtual protocol channel of a remote display protocol, established between the virtual desktop client 206 and the virtual desktop agent 224. If the user 202 is not connected to the remoting session, the Application Event Controller 228 will send the application event to the Connection Server 252, which will in turn transfer the event to the client device 200 because the session between the Connection server 252 and the client device 200 still exists.

Remote Application Event Setter 214

In various embodiments, the Remote Application Event Setter 214 is implemented to display a UI 212 on the virtual desktop client 206 so that user 202 can configure which remote applications events should be monitored on the virtual desktop. For example, the user may be displayed a list of all videoconferencing and messaging applications available on the virtual desktop and be provided to specify which specific events (e.g. incoming call, incoming message, etc.) should be monitored. Once the configuration is done and user 202 clicks the OK button indicating the events, the configuration information is transmitted to the Connection Server 252, which will provide the list of events to the Application Event Tracker 232.

Remote Application Event Handler 210

In various embodiments, the Remote Application Event Handler 210 runs on the virtual desktop client 206 and is responsible for displaying a pop-up dialog to indicate the remote application event when the Remote Application Event Handler 210 receives the notification of the event from either directly from the Application Event Controller 228 or from the Connection Server 252. In various embodiments, the Remote Application Event Handler 210 will display popup dialog to provide a number of different options for the user. For example, in cases where the remoting session is still actively connected and the window of the virtual desktop is merely hidden from view, the pop-up dialog may simply allow the user 202 to switch to the window of the virtual desktop where the event is occurring so that the user 202 is able to answer the incoming call or otherwise respond to the detected event. In cases where the remoting session has been disconnected due to inactivity, the pop-up dialog may enable the user 202 to reestablish the remoting session connection to the virtual desktop to address the detected event. Alternatively, the pop-up dialog may enable the user to directly launch the application in which the event was detected as a seamless application window on the client device 200 instead of opening the UI to the entire virtual desktop.

Remote Application Event Maintainer 254

In various embodiments, the Remote Application Event Maintainer 254 is configured to maintain the application event configuration information for each user. On one hand, it receives and stores the app event configuration information from the Remote Application Event Setter 214 on the virtual desktop client 206. On the other hand, it pushes the configuration information about the specified application events to the Application Event Tracker 232 on the virtual desktop agent 224 when user establishes the remote connection.

Remote Application Event Connector 256

In various embodiments, the Remote Application Event Connector 256 is implemented to relay the notification about the application event to the client device 200 in cases where the remoting session between the virtual desktop client 206 and the virtual desktop agent 224 has become disconnected. As previously described, if the remoting session is still maintaining an active connection, then the Application Event Controller 228 can send the notification about the application event directly to the Remote Application Event Handler 210 on the client device 200. However, if the remoting session is inactive or disconnected, the Application Event Controller 228 sends the notification to the Remote Application Event Connector 256 on the Connection Server 252, which in turns relays the notification to the Remote Application Event Handler 210.

Figure 3A:
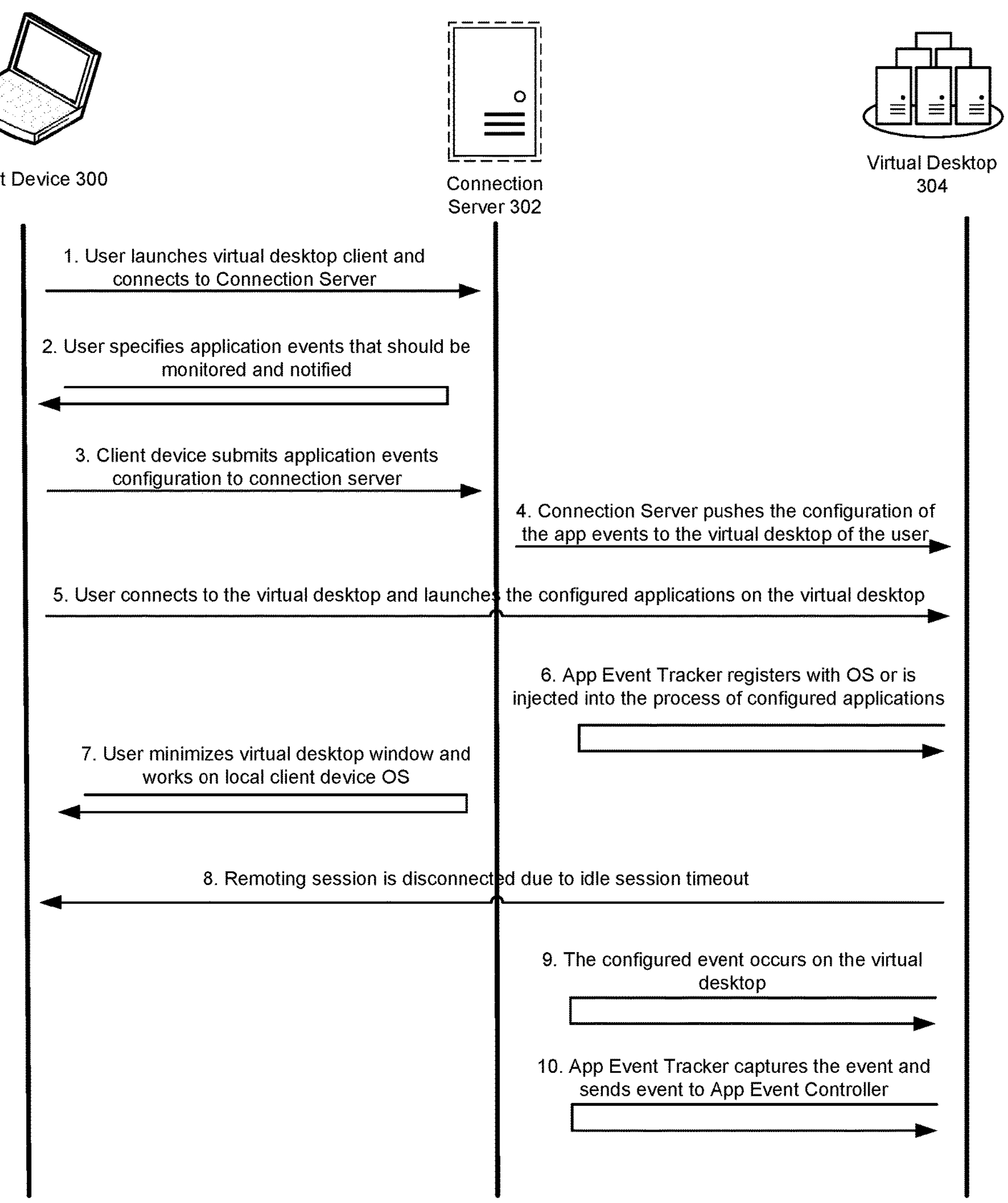
FIG. 3A is an illustration of a process flow between the client device, the connection server and the virtual desktop, in accordance with various embodiments.

FIG. 3A is an illustration of a process flow between the client device, the connection server and the virtual desktop, in accordance with various embodiments. As illustrated in step (1), the user on the client device 300 launches the virtual desktop client and connects to the connection server 302. In step (2), the user specifies the application events that should be monitored on the virtual desktop to generate notifications. In step (3), the client device 300 submits the configuration information about the specified application events to the connection server 302. In step (4), the connection server 302 pushes the configuration information of the application events to the virtual desktop 304 of the user. In step (5), the user connects to the virtual desktop and launches one or more of the applications for which the events have been specified on the virtual desktop 304. In step (6), the Application Event Tracker either registers to listen for the specified events with the operating system (OS) or is injected into the process of the configured applications, as previously described.

In step (7), the user minimizes the virtual desktop window and switches to work locally on the client device 300. After some time, in step (8), the remoting session is disconnected due to session timeout for inactivity. In step (9), one or more of the specified events occurs on the virtual desktop. As previously mentioned, even though the remoting session has disconnected, the virtual desktop may still be running on the host server and the virtual desktop agent may still maintain a connection to the connection server when the event is detected. In step (10), the Application Event Tracker captures the application event and sends the event to the Application Event Controller on the virtual desktop 304. The process flows continues on FIG. 3B.

Figure 3B:
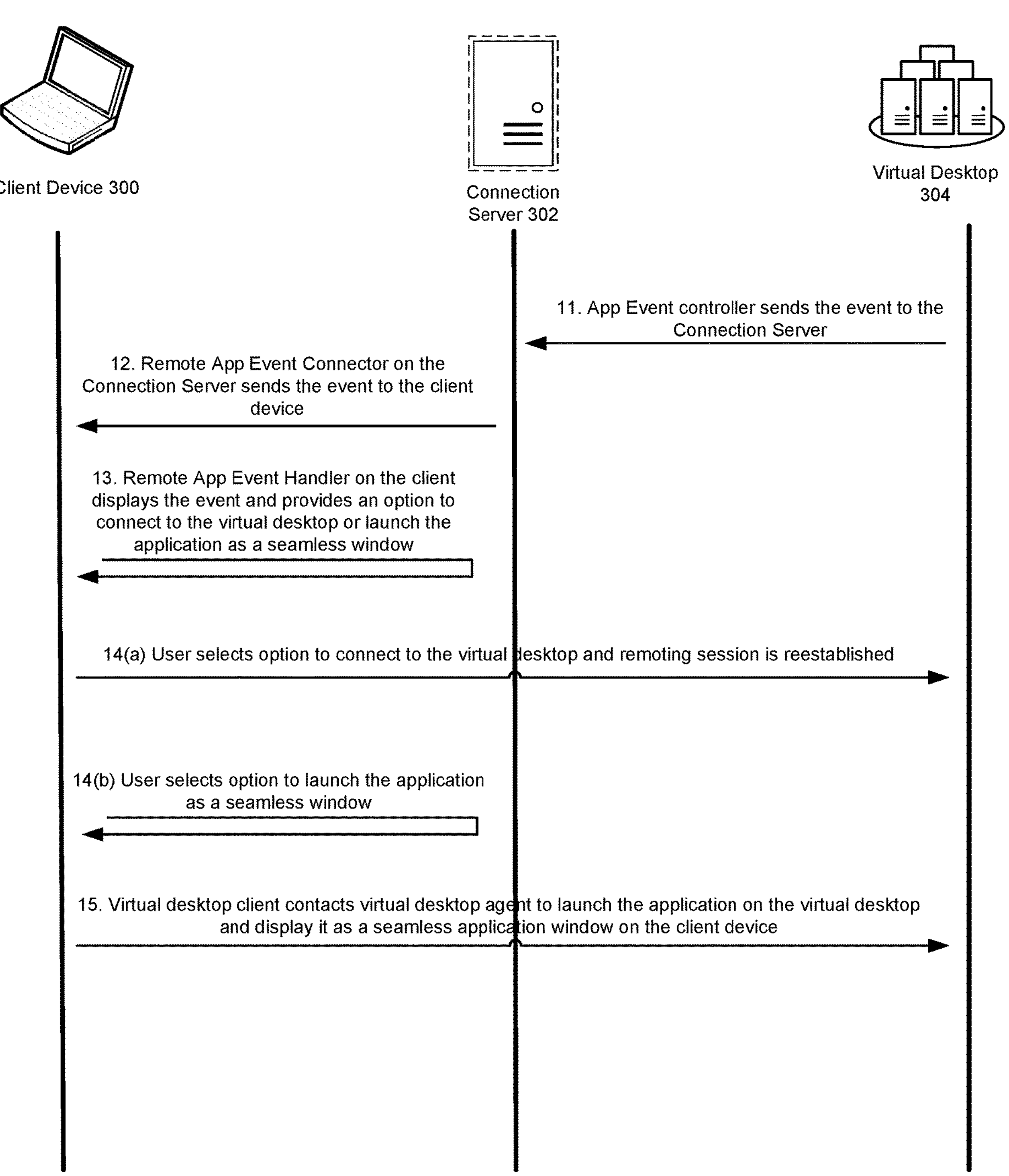
FIG. 3B is a continuation illustration of the process flow between the client device, the connection server and the virtual desktop illustrated in FIG. 3A, in accordance with various embodiments.

FIG. 3B is a continuation illustration of the process flow between the client device, the connection server and the virtual desktop illustrated in FIG. 3A, in accordance with various embodiments. As shown in step (11), the Application Event Controller sends a notification of the application event to the connection server 302. In step (12), the Remote Application Event Connector on the connection server 302 sends the notification about the application event to the client device 300. In step (13), the Remote Application Event Handler on the client device 300 displays the notification about the application event and provides an option for the user to connect to the virtual desktop or to launch the application in which the event occurred as a seamless window.

In step (14*a*), the user may select the option to connect to the virtual desktop. In that case, the virtual desktop client on the client device reestablishes the remoting session with the virtual desktop agent on the host server. The user may then respond to the application event, such as by answering the incoming call or responding to the incoming message, as previously described. Alternatively, in step (14*b*), the user may elect to instead launch the application directly as a seamless window on the client device. In that case, in step (15), the virtual desktop client contacts virtual desktop agent to launch the application on the virtual desktop and display the application as a seamless application window on the client device by hiding the remainder of the user interface of the virtual desktop and only displaying the UI of the application in which the event was detected.

Figure 4:
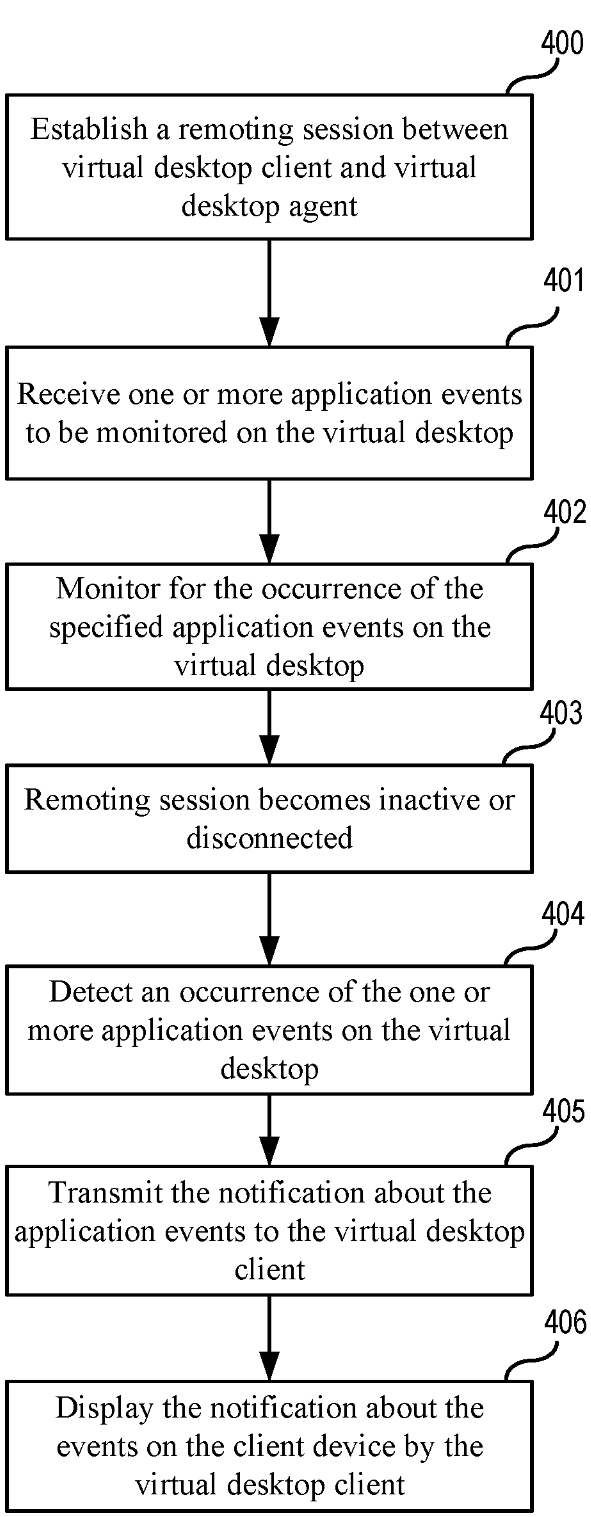
FIG. 4 is an illustration of a process to enable the handling of application events on inactive or disconnected virtual desktop, in accordance with various embodiments.

FIG. 4 is an illustration of a process to enable the handling of application events on inactive or disconnected virtual desktop, in accordance with various embodiments. As shown in operation 400, a remoting session is established between the virtual desktop client and the virtual desktop agent. In operation 401, the user specifies one or more application events to be monitored on the virtual desktop. Alternatively, a set of default application events may be provided without requiring any user input. The configuration information about the application events is provided to the virtual desktop agent running on the host server.

In operation 402, the Application Event Tracker on the virtual desktop begins monitoring for the occurrence of the specified application events. In operation 403, the remoting session may become disconnected or inactive due to session timeout. In operation 404, the one or more specified application events are detected on the virtual desktop, such as by the Application Event Tracker. In operation 405, a notification about the detected application event is transmitted from the virtual desktop to the client device. In one embodiment, if the remoting session is still maintaining an active connection, the notification can be sent directly from the virtual desktop agent to the virtual desktop client over a virtual protocol channel. Alternatively, if the remoting session is no longer active, the notification is sent from the virtual desktop to the connection server, which in turn relays the notification to the client device of the user. In operation 406, the client device displays the notification locally on the operating system of the client device. For example, the client device may display a pop-up dialog that displays information about the detected event and enable the user to either reestablish the remoting session to the virtual desktop or to launch the application in which the event was detected as a seamless application window on the client device.

Figure 5:
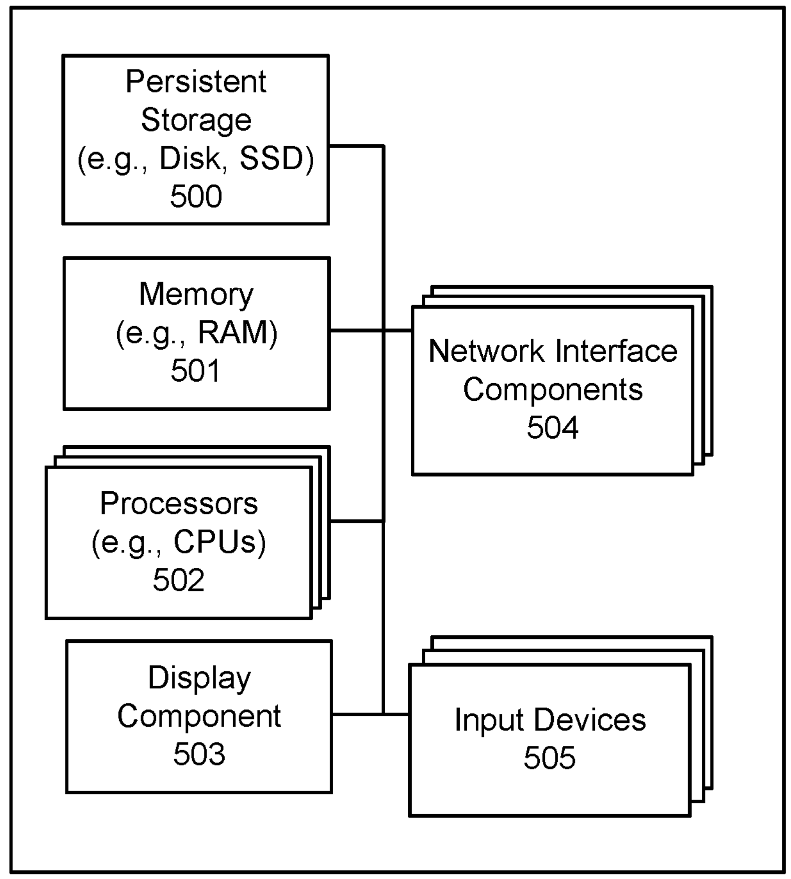
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random-access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for handling events occurring in inactive or disconnected virtual desktop sessions, the method comprising:

establishing a remoting session between a virtual desktop client operating on a client device and a virtual desktop agent operating on a host server, the remoting session configured to access a virtual desktop running on the host server over a remote display protocol;

receiving, by the virtual desktop agent, configuration data identifying an application executing in the virtual desktop and one or more application events of the application to be monitored on the virtual desktop;

monitoring for occurrence of the one or more application events on the virtual desktop;

detecting an occurrence of the one or more application events on the virtual desktop;

determining whether the remoting session to access the virtual desktop is active or inactive;

in response to determining that the remoting session to access the virtual desktop is active, transmitting, via a virtual protocol channel of the remote display protocol, a notification to the virtual desktop client indicating that the one or more application events are occurring, wherein the virtual desktop client displays the notification; and in response to determining that the remoting session is inactive, maintaining, during inactivity of the remoting session, a first persistent connection between the virtual desktop agent and a connection server and a second persistent connection between the virtual desktop client and the connection server, independent of the remoting session;

sending, by the virtual desktop agent via the first persistent connection, a message to the connection server indicating occurrence of the one or more application events, wherein the connection server, in response to the message, instructs the client device via the second persistent connection to display a first option to reestablish the remoting session by the virtual desktop client and a second option to launch the application as a seamless window on the client device;

receiving an indication of a selection of the first option or the second option;

in response to receiving the indication of the selection of the first option, causing the remoting session to be reestablished between the virtual desktop agent and the virtual desktop client; and in response to receiving the indication of the selection of the second option, causing the virtual desktop agent to launch the application on the virtual desktop and instructing the virtual desktop client to display the application executing on the virtual desktop as a seamless application window on the client device, wherein the seamless application window displays only a user interface of the application in which the one or more application events were detected and hides a remainder of a user interface of the virtual desktop that is executing the application.

2. The method of claim 1, wherein the one or more application events include an incoming communication in a videoconferencing application or instant messaging (IM) service.

3. The method of claim 1, wherein the connection server is configured to establish the remoting session between the virtual desktop client and the virtual desktop agent.

4. The method of claim 1, wherein during a time period while the remoting session is inactive, the virtual desktop client establishes a second remoting session to access a second virtual desktop.

5. The method of claim 4, wherein the notification is displayed on the client device while the virtual desktop client is accessing the second virtual desktop.

6. A computing system, comprising:

at least one processor; and memory including instructions that, when executed by the at least one processor, cause the computing system to perform the steps of:

establishing a remoting session between a virtual desktop client operating on a client device and a virtual desktop agent operating on a host server, the remoting session configured to access a virtual desktop running on the host server over a remote display protocol;

receiving, by the virtual desktop agent, configuration data identifying an application executing in the virtual desktop and one or more application events of the application to be monitored on the virtual desktop;

monitoring for occurrence of the one or more application events on the virtual desktop;

detecting an occurrence of the one or more application events on the virtual desktop;

determining whether the remoting session to access the virtual desktop is active or inactive;

in response to determining that the remoting session to access the virtual desktop is active, transmitting, via a virtual protocol channel of the remote display protocol, a notification to the virtual desktop client indicating that the one or more application events are occurring, wherein the virtual desktop client displays the notification; and in response to determining that the remoting session is inactive, maintaining, during inactivity of the remoting session, a first persistent connection between the virtual desktop agent and a connection server and a second persistent connection between the virtual desktop client and the connection server, independent of the remoting session;

sending, by the virtual desktop agent via the first persistent connection, a message to the connection server, wherein the connection server, in response to the message, instructs the client device via the second persistent connection to display a first option to reestablish the remoting session by the virtual desktop client and a second option to launch the application as a seamless window on the client device;

receiving an indication of a selection of the first option or the second option;

in response to receiving the indication of the selection of the first option, causing the remoting session to be reestablished between the virtual desktop agent and the virtual desktop client; and in response to receiving the indication of the selection of the second option, causing the virtual desktop agent to launch the application on the virtual desktop and instructing the virtual desktop client to display the application executing on the virtual desktop as a seamless application window on the client device, wherein the seamless application window displays only a user interface of the application in which the one or more application events were detected and hides a remainder of a user interface of the virtual desktop that is executing the application.

7. The computing system of claim 6, wherein the one or more application events include an incoming communication in a videoconferencing application or instant messaging (IM) service.

8. The computing system of claim 6, wherein the connection server is configured to establish the remoting session between the virtual desktop client and the virtual desktop agent.

9. The computing system of claim 6, wherein during a time period while the remoting session is inactive, the virtual desktop client establishes a second remoting session to access a second virtual desktop.

10. The computing system of claim 9, wherein the notification is displayed on the client device while the virtual desktop client is accessing the second virtual desktop.

11. A non-transitory computer readable storage medium comprising one or more sequences of instructions, the instructions when executed by one or more processors causing the one or more processors to execute the operations of:

establishing a remoting session between a virtual desktop client operating on a client device and a virtual desktop agent operating on a host server, the remoting session configured to access a virtual desktop running on the host server over a remote display protocol;

receiving, by the virtual desktop agent, configuration data identifying an application executing in the virtual desktop and one or more application events of the application to be monitored on the virtual desktop;

monitoring for occurrence of the one or more application events on the virtual desktop;

detecting an occurrence of the one or more application events on the virtual desktop;

determining whether the remoting session to access the virtual desktop is active or inactive;

in response to determining that the remoting session to access the virtual desktop is active, transmitting, via a virtual protocol channel of the remote display protocol, a notification to the virtual desktop client indicating that the one or more application events are occurring, wherein the virtual desktop client displays the notification; and in response to determining that the remoting session is inactive, maintaining, during inactivity of the remoting session, a first persistent connection between the virtual desktop agent and a connection server and a second persistent connection between the virtual desktop client and the connection server, independent of the remoting session;

sending, by the virtual desktop agent via the first persistent connection, a message to the connection server, wherein the connection server, in response to the message, instructs the client device via the second persistent connection to display a first option to reestablish the remoting session by the virtual desktop client and a second option to launch the application as a seamless window on the client device;

receiving an indication of a selection of the first option or the second option;

in response to receiving the indication of the selection of the first option, causing the remoting session to be reestablished between the virtual desktop agent and the virtual desktop client; and in response to receiving the indication of the selection of the second option, causing the virtual desktop agent to launch the application on the virtual desktop and instructing the virtual desktop client to display the application executing on the virtual desktop as a seamless application window on the client device, wherein the seamless application window displays only a user interface of the application in which the one or more application events were detected and hides a remainder of a user interface of the virtual desktop that is executing the application.

12. The non-transitory computer readable storage medium of claim 11, wherein the one or more application events include an incoming communication in a videoconferencing application or instant messaging (IM) service.

13. The non-transitory computer readable storage medium of claim 11, wherein the connection server is configured to establish the remoting session between the virtual desktop client and the virtual desktop agent.

14. The non-transitory computer readable storage medium of claim 11, wherein during a time period while the remoting session is inactive, the virtual desktop client establishes a second remoting session to access a second virtual desktop.

15. The method of claim 1, wherein monitoring for the occurrence of the one or more application events is performed by an application tracker that is implemented as a dynamic link library (DLL) that is injected into the application by a DLL injection driver.

16. The method of claim 1, wherein monitoring for the one or more application events is performed by an application event tracker executing within a guest operating system of the virtual desktop, the application event tracker being configured to detect the one or more application events by intercepting application-level messaging events generated by the application and forwarding event data to an event handler of the virtual desktop agent that communicates with the connection server.

17. The computing system of claim 6, wherein monitoring for the one or more application events is performed by an application event tracker executing within a guest operating system of the virtual desktop, the application event tracker being configured to detect the one or more application events by intercepting application-level messaging events generated by the application and forwarding event data to an event handler of the virtual desktop agent that communicates with the connection server.

18. The non-transitory computer readable storage medium of claim 11, wherein monitoring for the one or more application events is performed by an application event tracker executing within a guest operating system of the virtual desktop, the application event tracker being configured to detect the one or more application events by intercepting application-level messaging events generated by the application and forwarding event data to an event handler of the virtual desktop agent that communicates with the connection server.

* * * * *